US011194970B2

(12) United States Patent
Guidotti et al.

(10) Patent No.: US 11,194,970 B2
(45) Date of Patent: Dec. 7, 2021

(54) CONTEXT-BASED TOPIC RECOGNITION USING NATURAL LANGUAGE PROCESSING

(71) Applicant: International Business Machines Corporation, Armonk, NY (US)

(72) Inventors: Alice Guidotti, Rome (IT); Massimo Villani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 16/579,462

(22) Filed: Sep. 23, 2019

(65) Prior Publication Data

US 2021/0089623 A1 Mar. 25, 2021

(51) Int. Cl.
*G06F 16/332* (2019.01)
*H04L 12/58* (2006.01)
*H04L 29/06* (2006.01)
*G06F 40/30* (2020.01)

(52) U.S. Cl.
CPC .......... *G06F 40/30* (2020.01); *G06F 16/3329* (2019.01); *H04L 51/04* (2013.01); *H04L 65/403* (2013.01); *H04L 67/42* (2013.01)

(58) Field of Classification Search
CPC ...... G06F 40/30; G06F 16/3329; G06F 40/35; G06F 40/284; G06F 16/35; H04L 65/403; H04L 51/04; H04L 67/42; H04L 51/18
See application file for complete search history.

(56) References Cited

U.S. PATENT DOCUMENTS

| | | | |
|---|---|---|---|
| 2012/0331063 A1 | 12/2012 | Rajaram | |
| 2013/0007137 A1* | 1/2013 | Azzam | H04L 51/16 |
| | | | 709/206 |
| 2016/0012818 A1 | 1/2016 | Faizakof | |
| 2018/0129646 A1 | 5/2018 | Heck | |
| 2018/0295077 A1 | 10/2018 | Scherpa | |
| 2019/0114340 A1* | 4/2019 | Feijoo | G06F 16/215 |
| 2021/0157858 A1* | 5/2021 | Stevens | G06F 16/90335 |

OTHER PUBLICATIONS

Mell et al., "The NIST Definition of Cloud Computing", National Institute of Standards and Technology, Special Publication 800-145, Sep. 2011, 7 pages.

* cited by examiner

*Primary Examiner* — Soe Hlaing
(74) *Attorney, Agent, or Firm* — Michael A. Petrocelli

(57) ABSTRACT

A method, system and computer program product for topic recognition in a written conversation includes receiving, by one or more processors, a written conversation from a collaborative messaging system used by a user. The one or more processors perform a first search in the written conversation to find additional concepts associated with a topic stored in a knowledge base of the user. Each of the additional concepts includes a descriptor of the topic. In response to finding at least one additional concept associated with the topic in the written conversation, the one or more processors tag the at least one additional concept to the topic such that the at least one additional concept is replaced by the topic in the knowledge base.

17 Claims, 7 Drawing Sheets

US 11,194,970 B2

CONTEXT-BASED TOPIC RECOGNITION USING NATURAL LANGUAGE PROCESSING

BACKGROUND

The present invention generally relates to the field of natural language processing, and more particularly to a method, system and computer program product for automatic topic recognition in written conversations.

Within various social and/or work environments, individuals frequently communicate throughout the day regarding a variety of different topics by way of a collaborative messaging session such as a chat or instant messaging application. With the advent of artificial intelligence (AI), text messages entered during collaborative messaging sessions may be analyzed using techniques such as natural language processing (NLP) to infer a topic of the conversation, which may then be used to enhance information retrieval and user connectivity. However, identifying the topic of the conversation occurring between two or more participants of the collaborative messaging session when a context of the conversation is not clear can be a challenging task. For example, keywords related to the topic may not be entered during the session or ambiguous terms can be used which may not be descriptive enough as to identify the topic of the conversation.

SUMMARY

Shortcomings of the prior art are overcome and additional advantages are provided through the provision of a method for automatic topic recognition in written conversations. The method includes receiving, by one or more processors, a written conversation from a collaborative messaging system used by a user, performing, by the one or more processors, a first search in the written conversation to find additional concepts associated with a topic stored in a knowledge base of the user. Each of the additional concepts includes a descriptor of the topic, and in response to finding at least one additional concept associated with the topic in the written conversation, tagging, by the one or more processors, the at least one additional concept to the topic such that the at least one additional concept is replaced by the topic.

Another embodiment of the present disclosure provides a computer program product for topic recognition in a written conversation, based on the method described above.

Another embodiment of the present disclosure provides a computer system for topic recognition in a written conversation, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Collaborative messaging systems have become widely adopted across both work and personal environments. Particularly, in work environments collaborative messaging applications may emphasize and enable teamwork by facilitating real-time communication and distribution of information between team members. In general, identifying the topic of a collaborative messaging session and associated concepts can help understanding ambiguous terms that can be entered during future collaborative messaging session(s) and categorizing the collaborative messaging sessions for later reference.

Embodiments of the present invention generally relates to the field of natural language processing, and more particularly to a method, system and computer program product for topic recognition in written conversations. The following described exemplary embodiments provide a system, method, and computer program product to, among other things, generate a knowledge base associated with one or more users of a collaborative messaging application, expanding the knowledge base with additional concepts related to the one or more users for one or more topics, and identifying a (main) topic of a written conversation occurring via the collaborative messaging program based on the knowledge base. Therefore, the present embodiments have the capacity to improve the technical field of natural language processing by automatically identifying the topic of a written conversation during a collaborative messaging session even when keywords related to that topic are absent within the conversation. Additionally, the present embodiments provide a recurrent process by which the knowledge base can be continuously expanded thereby facilitating topic recognition and categorization of collaborative messaging sessions for future reference or retrieval. By continuously expanding the knowledge base, embodiments of the present disclosure are capable of learning from different information sources and past conversations among users facilitating the understanding of current and future conversations between similar or different users of a collaborative messaging program.

Figure 1:
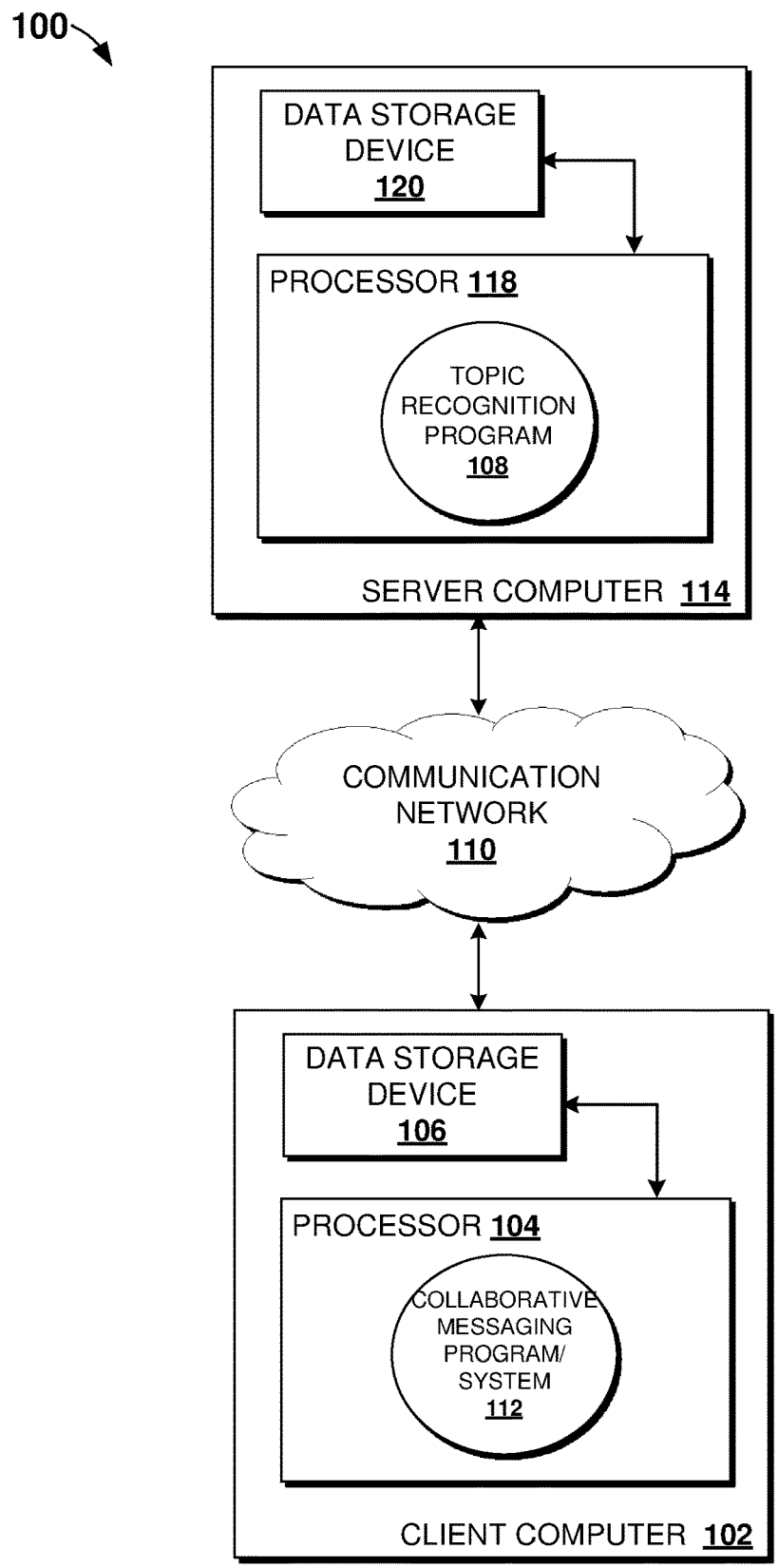
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a server computer 114 with a processor 118 and a data storage device 120 that is enabled to run a topic recognition program 108. In some embodiments, server computer 114 may be a resource management server, a web server or any other electronic device capable of receiving and sending data. In another embodiment, server computer 114 may represent a server computing system utilizing multiple computers as a server system, such as in a cloud computing environment.

The networked computer environment 100 may also include a client computer 102 and a communication network 110. The client computer 102 may include a processor 104 and a data storage device 106 that is enabled to run a collaborative messaging program (or system) 112. Client computer 102 may be, for example, a mobile device, a telephone (including smartphones), a personal digital assistant, a netbook, a laptop computer, a tablet computer, a desktop computer, or any type of computing devices capable of accessing a network. The collaborative messaging program 112 may include any known personal or business collaborative messaging application such as, for example, IBM Sametime®, Slack®, AOL Instant Messenger®, Facebook Messenger®, Google Hangouts®, Instagram Direct Messaging®, Apple iMessage®, WhatsApp®, and the like. As known by those skilled in the art, in some embodiments, the collaborative messaging program 108 may be running on both the client computer 102 and the server computer 114.

The topic recognition program 108 running on server computer 114 may communicate with the collaborative messaging program 112 running on client computer 102 via the communication network 110. As will be discussed with reference to FIG. 5, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
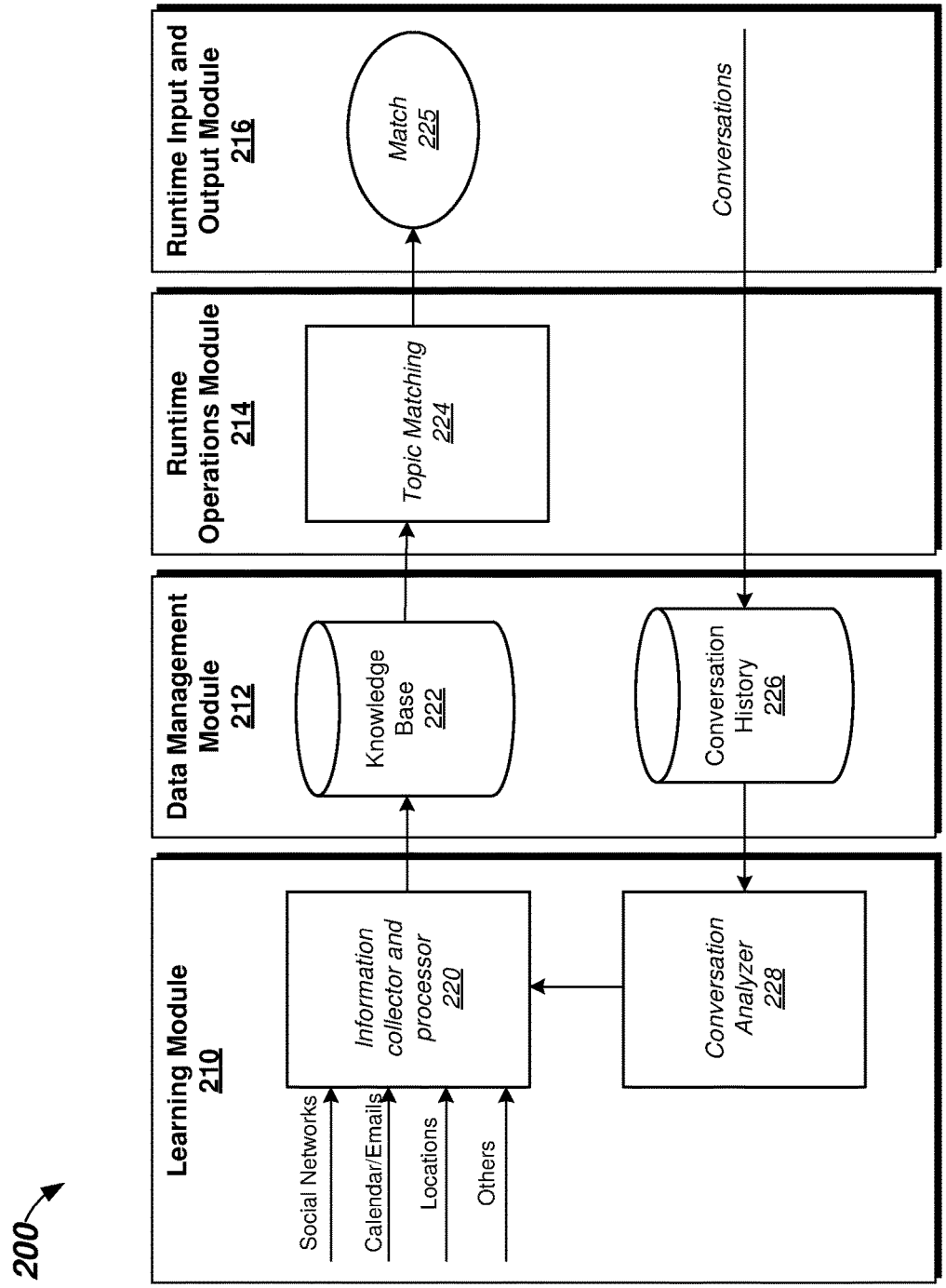
FIG. 2 is an exemplary block diagram illustrating components of a system for topic recognition in written conversations, according to an embodiment of the present disclosure.

Referring now to FIG. 2, an exemplary block diagram depicting components of a computer system 200 suitable for implementing a method of topic recognition in written conversations is shown, according to an embodiment of the present disclosure. A two-step algorithm is implemented by the computer system 200 to recognize a topic within a written conversation taking place between two or more individuals via a collaborative messaging application (e.g., collaborative messaging program 112 in FIG. 1).

In the first step, a learning module 210 of the computer system 200 including an information collector and processor unit 220 collects information associated with individuals (hereinafter referred to as "users") participating in a chat session via the collaborative messaging application. The collected information can include general background information regarding the users. Specifically, data corresponding to age group, employer, geographic location, and the like can be gathered by the learning module 210. The information can be collected from different sources including, for example, social networks, calendars, emails, user's location and, in some instances, direct user feedback.

It should be noted that any user data collection is done with user consent via, for example, an opt-in and opt-out feature. As known by those skilled in the art, an opt-in and opt-out feature generally relates to methods by which the user can modify a participating status (i.e., accept or reject the data collection). In some embodiments, the opt-in and opt-out feature can include a software application(s) available in the client computer 102. Additionally, the user can choose to stop having his/her information being collected or used. In some embodiments, the user can be notified each time data is being collected and can stop the data collection at any time. The collected data is envisioned to be secured and not shared with anyone without consent.

Based on the collected information by the learning module 210, the data management module 212 creates a knowledge base 222 of background information associated with each of the users. The knowledge base 222 is created by leveraging the information obtained from the different sources of information described above. Each information entry for a given user in the knowledge base 222 can be represented as a tuple that includes:

{topic i, additional-concept-1, additional-concept-2, . . . additional-concept-n} where, topic i ($1 \leq i \leq n$): is a general topic of the conversation including subject matter the computer system 200 aims at identifying in the text entered (i.e., written conversation) during the chat session, and additional-concept-i ($1 \leq i \leq n$): represents at least one feature or characteristic identifying a context for a particular user. Specifically, each additional concept i provides a descriptor associated with the topic selected based on the collected information.

The knowledge base 222 is then used by a runtime operations module 214 to infer a possible topic (topic matching 224) for the written conversation(s) occurring during the collaborative messaging session between the users. For instance, consider the following conversation between users Alice and Bob:

Alice: "How are Tom and Cathy?"

Bob: "Fine, thank you. They are finally enjoying their vacation."

Alice: "I recall it is about to be Cathy's birthday, Am I right?"

Bob: "Oh, yes. It is the 15th of August."

Alice: "Have you had news about Brian?"

Bob: "Oh, yes. They moved to Spring Road, Atlanta"

In the above conversation only general information is provided, Bob and Alice could be having a conversation about many different topics (e.g., Bob's colleagues, Bob's children, Bob's friends). The fact that only general information regarding Tom, Cathy and Brian is provided during the conversation between Bob and Alice can make difficult the recognition of the conversation topic by the computer system 200 without any previous information regarding Bob and Alice.

According to an embodiment, the computer system 200 may, based on the knowledge base 222, assume that Tom and Cathy are additional concepts for topic "kids" associated with user Bob, and Brian is an additional concept for topic "business partner" associated with both Alice and Bob. Using the knowledge base can augment the effectiveness and the number of matches of a topic search within the conversation. For example, searching for the words "kids" or "children" will automatically match the above conversation between Alice and Bob.

In some embodiments, the topic recognition can be generalized to topics that are not user related. For instance, topic "company" can be enriched with additional information such as company locations, technologies and the like.

In the second step, a runtime input and output module 216 uses the knowledge base 222 to infer or match (match 225) additional information associated with the topic from a history of conversations between the users. This additional information may be stored in, for example, a conversation history unit 226 and added to the knowledge base 222 to further enrich or expand it. For instance, from the above conversation between Alice and Bob, given that Brian is a known business partner associated with Alice and Bob, it can be inferred that his company has moved to Spring Road, Atlanta, this information can be added to expand the knowledge base for both Brian's and his company.

In order to do so, the computer system 200 performs a search in the knowledge base 222 to locate those additional concepts identified in the conversation between Alice and Bob. Then, each additional concept can be tagged or associated to the (main) topic. Each additional concept found during the search may provide insights about the topic of the conversation. It should be noted that the computer system 200 may perform an initial search and then repeat the search numerous times.

For example, in the above conversation between Alice and Bob, the sentence "How are Tom and Cathy?" becomes "How are Tom (tag: Bob's child) and Cathy (tag: Bob's child)?". Alternatively, the same sentence may be replaced by or store using a generic expression such as "How are your children?".

By tagging or associating each additional concept to the main topic, the context of the conversation is expanded which may facilitate the understanding of the conversation (conversation analyzer 228) by other users and/or computer systems. In an embodiment, the computer system 200 stores this information allowing the conversation to be searchable.

The process of finding additional concepts and tagging them to a topic can be repeated many times so additional information regarding the topic can be continuously collected from different sources (e.g., other conversations or additional information inputs such as calendar entries, etc.). Thus, the computer system 200 is continuously learning about the topic(s), which may in turn constantly expand the knowledge base associated with each user.

In some embodiments, the computer system 200, and particularly the runtime input and output module 216 is capable of identifying further additional topics, i.e. topics not present in the knowledge base 222 with regards to the main topic. Specifically, each additional concept can be represented by a tuple of pairs {concept-name. concept-value}. For instance, the following tuple can be established for user Bob:

{Children, {{name,Cathy},{date of birth,August 15th}}, {{name,Bob}}}

{Birthplace, {{name,Brian},{company, XYZ}}}

{XYZ, {{location, Spring Road, Atlanta}}}

For example, the computer system 200 may collect children's names and birthplaces based on external sources of information (emails, social networks, calendars, etc.) and the location and birthdates based on a conversation history between the users (e.g., Alice and Bob).

Accordingly, based on the knowledge base 222 and the additional concepts found by the computer system 200, the topic ("children") can be recognized from the conversation between Alice and Bob. The computer system 200, associates the name ("Cathy") and the birthdate ("August $15^{th}$") to Bob's children using the information available in the knowledge base 222, which has been expanded by including the conversation history between Alice and Bob. As shown in FIG. 2, with each interaction (e.g., conversations) between users (e.g., Alice and Bob) the information available in the knowledge base 222 expands thereby improving the accuracy in topic recognition.

The following figures described the two-step algorithm implemented by the computer system 200 to recognize the topic of a written conversation between participants of a collaborative messaging session.

Figure 3:
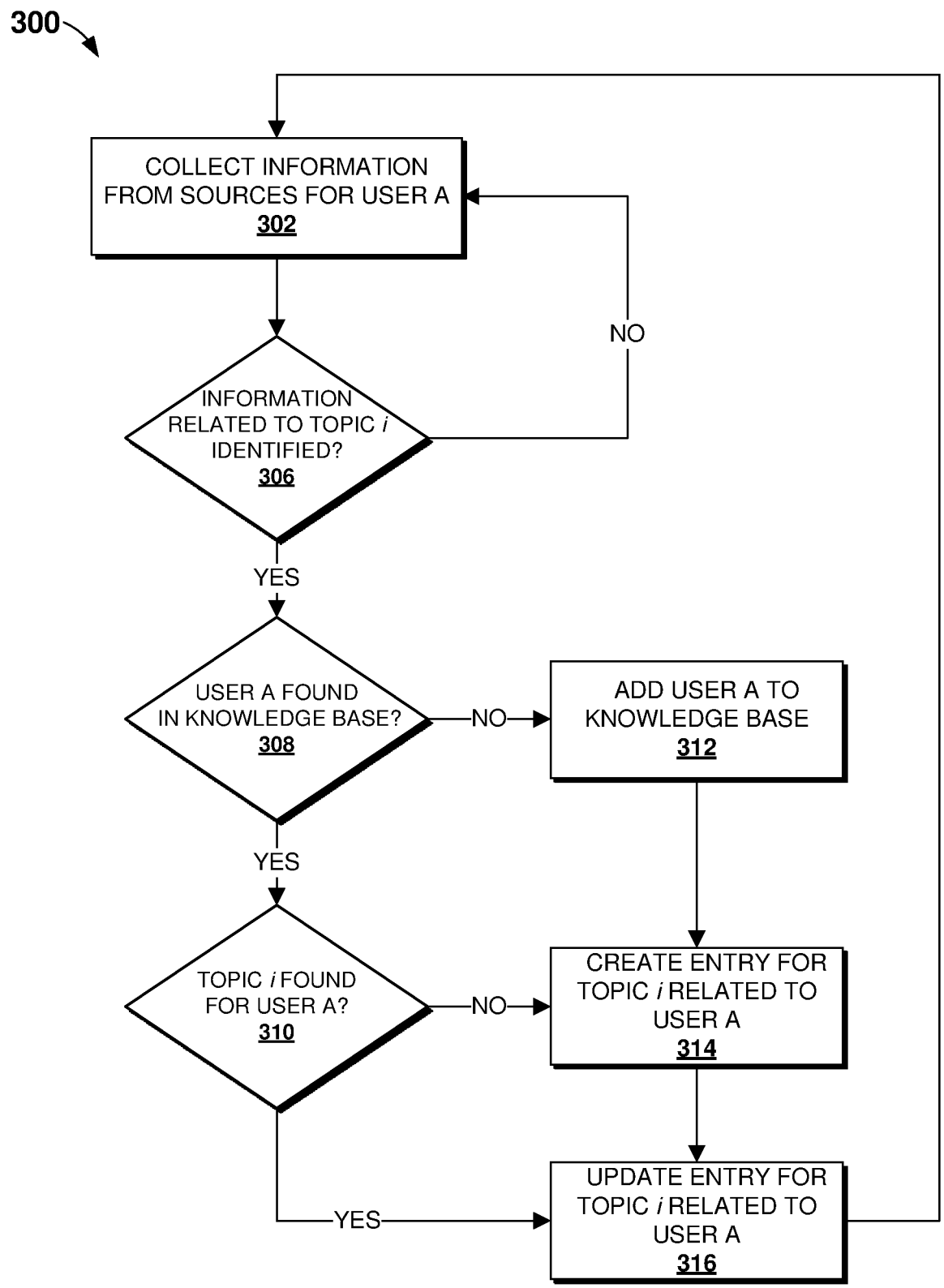
FIG. 3 is a flowchart illustrating a method for generating and/or updating a knowledge base associated with a user, according to an embodiment of the present disclosure.

Referring now to FIG. 3, a flowchart 300 illustrating the steps of a method for creating or expanding a knowledge base associated with a user is shown, according to an embodiment of the present disclosure. Specifically, FIG. 3 describes the first step in the two-step algorithm for topic recognition in written conversations described above with reference to FIG. 2. As may be understood by those skilled in the art, the knowledge base may include a repository of data about the user(s) of the collaborative messaging session obtained from different sources of information. For illustration purposes only, without intent of limitation, embodiments of the present disclosure will be described from the perspective of only one user (user A). It may be understood by those skilled in the art that the process can be applied to any number of users of the collaborative messaging tool (e.g., collaborative messaging program/system 112 in FIG. 1).

At step 302, information associated with user A is collected from different sources. As described above, the collected information can include general background information regarding user A. For example, the collected information may include data corresponding to age group, employer, geographic location, and the like. The information can be collected from different sources including, for example, social networks, calendars, emails, user's location, a history of previous conversations, and, in some instances, direct user feedback.

In embodiments in which a knowledge base associated with user A already exists in the computer system 200 (FIG. 2), the collected information is used to expand the existing knowledge base for user A. Each information entry for user A in the knowledge base can be represented as a tuple including:

{topic i, additional-concept-1, additional-concept-2, . . . additional-concept-n} where topic i ($1 \le i \le n$) is the topic to be identified and each additional-concept-i ($1 \le i \le n$) includes a descriptor associated with topic i.

At step 306, if information related to topic i is identified within the collected information the process continues with step 308. It should be noted that the information collected at step 302 may provide an initial guess of a possible context for the conversation in which user A is participating, and hence of "topic i".

If no information regarding topic i is found within the collected information at step 306, the process returns to step 302.

At step 308, based on the user A not existing in the knowledge base an entry is created at step 312. Specifically, user A is added to the knowledge base. It should be noted that if user A is using the collaborative messaging application for a first time, no prior entries corresponding to user A exist in the knowledge base and need to be created. Once the entry associated with user A is created at step 312, user A will exist in the knowledge base, and each time information regarding user A is found, the information can be linked to user A entry to expand the knowledge base.

The process continues at step 310, where based on identifying topic i within the knowledge base associated with user A, an entry associated with topic i is updated within the knowledge base associated with user A at step 316.

Based on not identifying topic i within the knowledge base associated with user A, a new entry is created within the knowledge base associated with topic i at step 314.

It should be noted that the steps of FIG. 3 can be repeated numerous times for different topics i ($1 \le i \le n$). For example, assuming that user A is Bob from the example of FIG. 2, a first iteration can be performed searching for topic 1="kids" in the knowledge base (step 306), if no entries are found related to Bob's kids, a new entry (based on the collected information regarding Bob) can be created adding Bob and Cathy as his kids (steps 310, 314). In another example, Bob's calendar shows an appointment for Cynthia (at step 302), a new search may then be performed for topic 2="wife" (at step 312), based on the collected information regarding Bob, it is confirmed that Cynthia is Bob's wife but an entry does not exist in the knowledge base for Cynthia (step 310), then a new entry for the topic "wife" is created in Bob's knowledge base (step 314).

The steps in FIG. 3 illustrate an iterative process in which a knowledge base associated with a user of a collaborative messaging application can be created and/or expanded such that a topic of a conversation can be automatically identified with minimal information provided during the conversation. The more entries are created in the knowledge base regarding different sub-topics (e.g., "wife", "kids", "work", etc.), the easier may become to identify a general or main topic of the conversation in which user A is participating.

Figure 4:
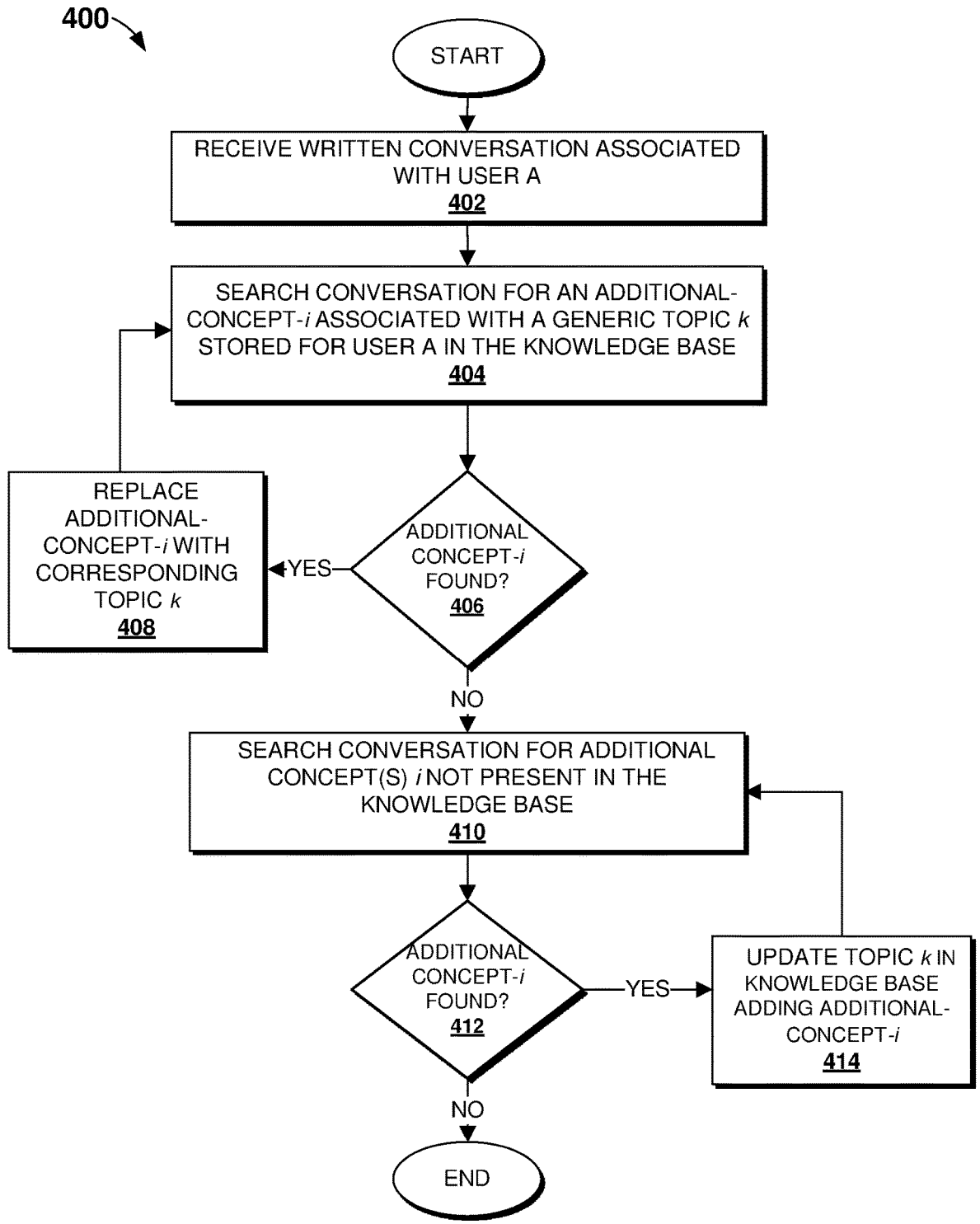
FIG. 4 is a flowchart illustrating a method for topic recognition using the knowledge base of FIG. 3, according to an embodiment of the present disclosure.

Referring now to FIG. 4, a flowchart illustrating the steps of a method for topic recognition using the knowledge base of FIG. 3 is shown, according to an embodiment of the present disclosure. Specifically, FIG. 4 describes the second step in the two-step algorithm for topic recognition in written conversations described above with reference to FIG. 2. In this embodiment, the knowledge base can be used to identify additional concepts associated with the topic to be identified.

The process starts at step 402 by receiving a written conversation in which user A is participating. A first search is then performed at step 404, this search may consist of a basic or initial search based on a set of keywords associated with a (generic) topic k. It should be note that the generic topic k may be different than topic i which is the main topic to be identified. As mentioned above, embodiments of the present disclosure provide an iterative process in which, with each iteration, a knowledge base associated with a user can be expanded by adding or tagging additional concepts to numerous topic or sub-topics.

With continued reference to FIG. 4, the search performed at step 404 may be a "full text search" based on known techniques such as pattern matching. Specifically, the written conversation is initially searched for an additional concept-i associated with the topic k that may already be stored in the knowledge base for user A (e.g., additional concept 1="kids birth date" associated with generic topic "kids" for user Bob).

In response to the additional concept-i being found in the knowledge base associated with user A, the additional concept-i (e.g., "kids birth date") is replaced or tagged with the associated topic k (e.g., "kids") at step 408. Stated differently, each time an additional topic (i.e. a descriptor or characteristic associated with the topic k) is found in the knowledge base, it is replaced with or tagged to the topic k. The more this process repeats the easier may be to understand or identify a context of the written conversation and, in consequence, to recognize the main topic of the conversation.

In response to the additional concept-i not being found in the knowledge base associated with user A, a second search is performed in the written conversation at step 410 looking for one or more additional concepts-i associated with the generic topic k not stored in the knowledge base for user A. In contrast with the first search conducted at step 404, the second search of step 410 may be based on more advanced techniques of natural language processing and text analysis, that may include, for example, semantic understanding of a text of the written conversation.

Based on the additional concept-i associated with generic topic k being found in the written conversation, topic k is updated in the knowledge base at step 414 by adding the additional concept-i to the knowledge base. Stated differently, each time an additional concept-i not found in the knowledge base for user A is found in the written conversation, it is tagged to the corresponding topic k such that, in a subsequent iteration, when that additional concept-i is found in the conversation, it can be automatically replaced by or associated with the topic k. The process then returns to step 410, in which a new (iterative) search for additional concepts begins. It should be noted that, due to the iterative nature of the process, the additional concept-i found may be different from the one initially searched, hence new additional concepts associated with the topic k may be found during each iteration and added to the knowledge base.

If no additional concept-i associated with the topic k is found in the written conversation, the process ends, and the main topic of the written conversation can be inferred from all the additional concepts-i associated with topic k. Stated differently, in response to finding at least one additional concept-i associated with the topic k in the written conversation, the at least one additional concept-i is tagged or associated to the topic k such that each time the at least one additional concept-i is found or appears in a future written conversation the at least one additional concept-i is replaced by the topic k.

Therefore, the iterative process described in FIG. 4 may allow for more accurate topic recognition and prediction in current and future conversations between the same or different users by continuously expanding a knowledge base associated with the users.

Figure 5:
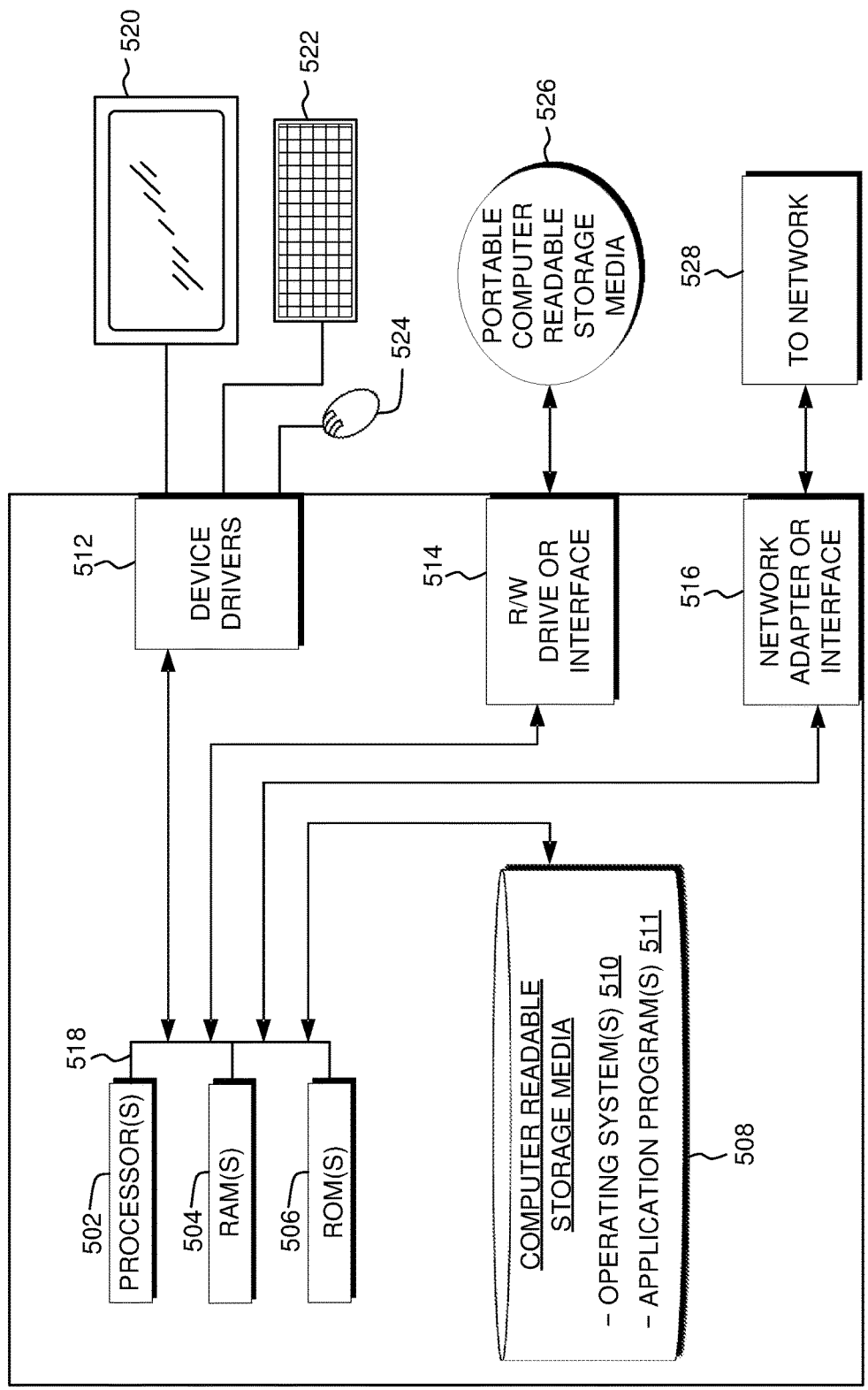
FIG. 5 is a block diagram of internal and external components of a computer system, according to an embodiment of the present disclosure.

Referring now to FIG. 5, a block diagram of components of client computer 102 and server computer 114 of networked computer environment 100 of FIG. 1 is shown, according to an embodiment of the present disclosure. It should be appreciated that FIG. 5 provides only an illustration of one implementation and does not imply any limitations regarding the environments in which different embodiments may be implemented. Many modifications to the depicted environment may be made.

Client computer 102 and server computer 114 may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511 are stored on one or more of the computer readable storage media 508 for execution by one or more of the processors 502 via one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 514 to read from and write to one or more portable computer readable storage media 526. Application programs 511 on client computer 102 and server computer 114 may be stored on one or more of the portable computer readable storage media 526, read via the respective R/W drive or interface 514 and loaded into the respective computer readable storage media 508.

Client computer 102 and server computer 114 may also include a network adapter or interface 516, such as a TCP/IP adapter card or wireless communication adapter (such as a 4G wireless communication adapter using OFDMA technology) for connection to a network 528. Application programs 511 on client computer 102 and server computer 114 may be downloaded to the computing device from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Client computer 102 and server computer 114 may also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 may include hardware and software (stored on computer readable storage media 508 and/or ROM 506).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
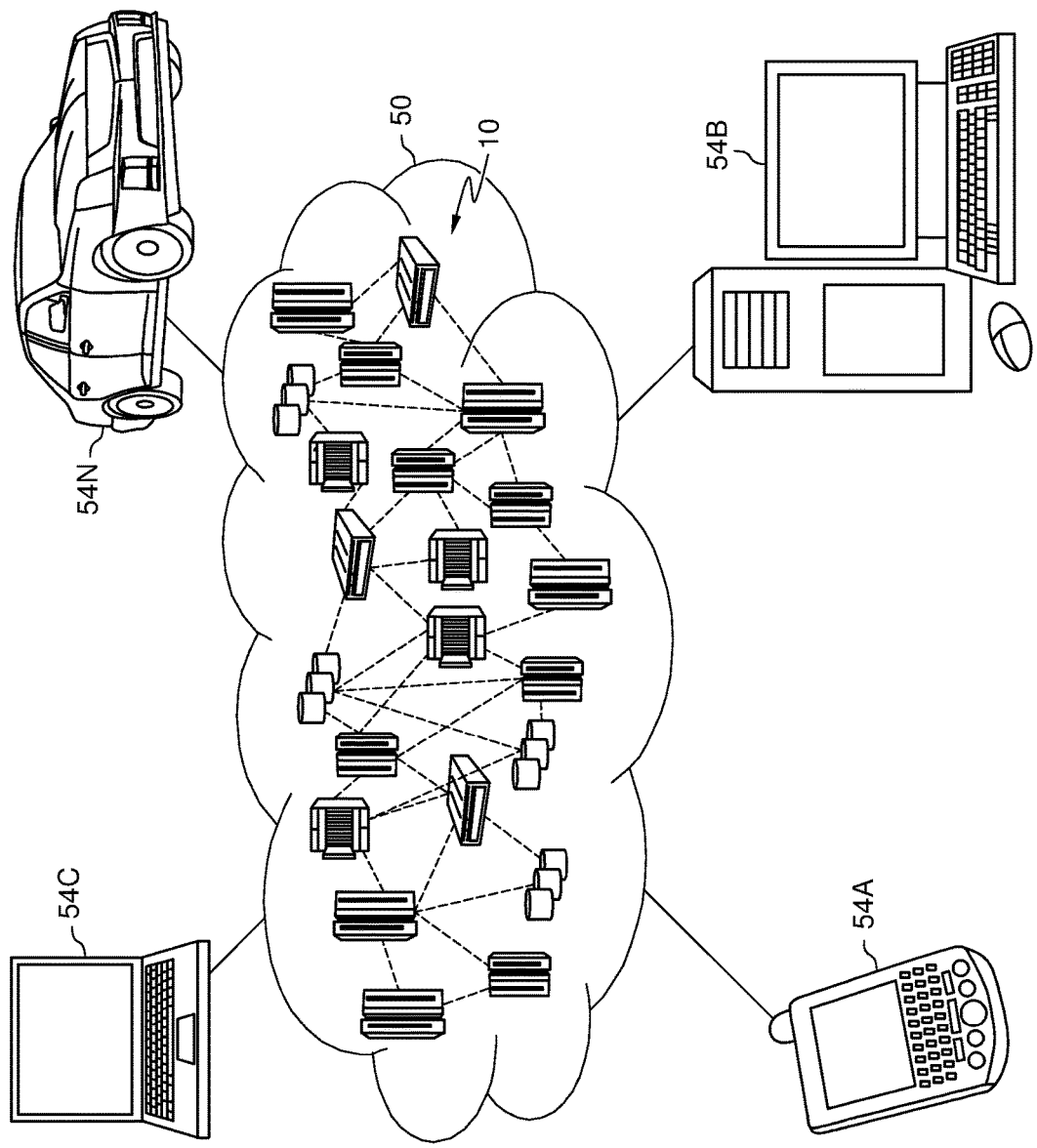
FIG. 6 is a block diagram of an illustrative cloud computing environment, according to an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
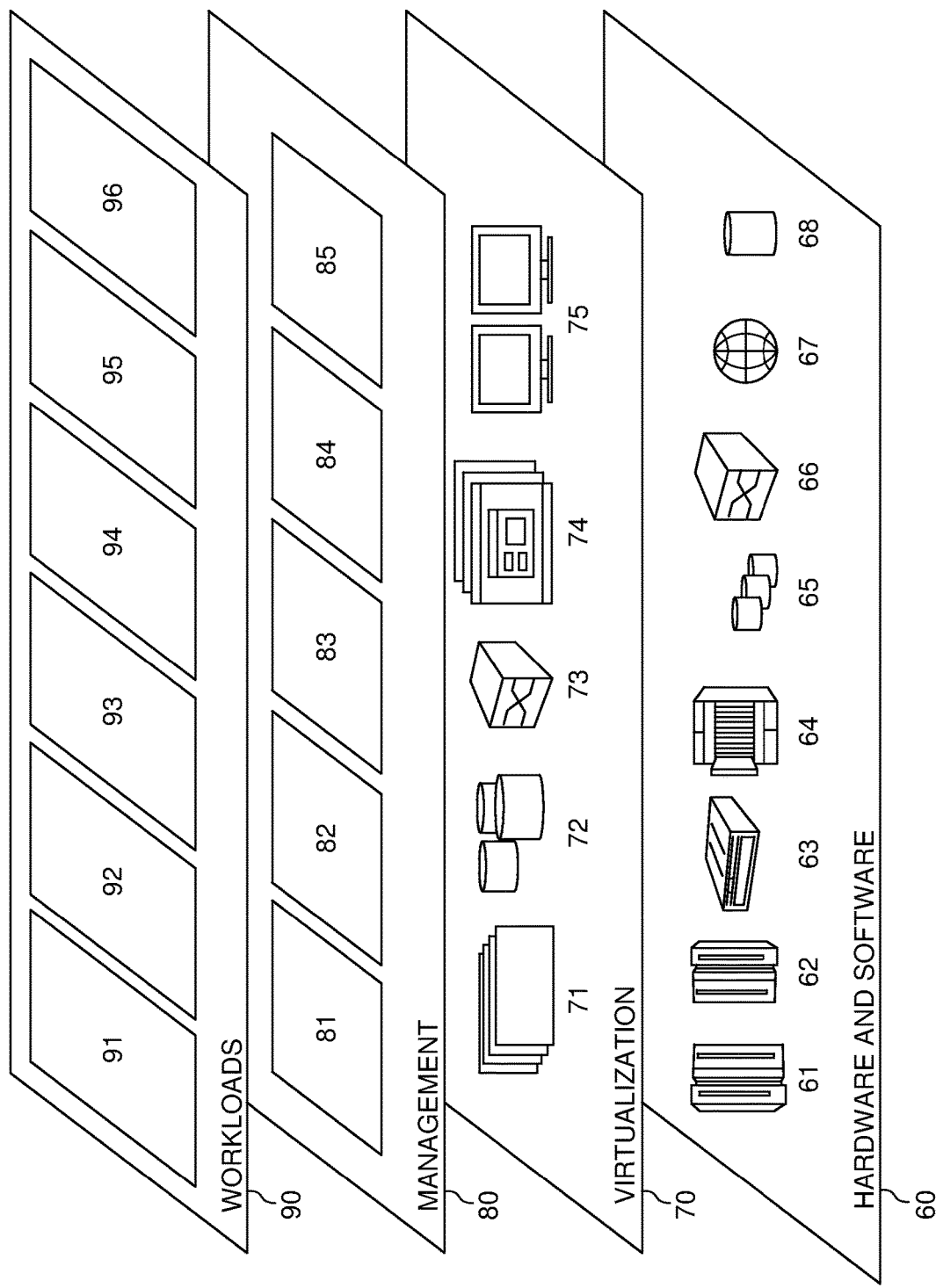
FIG. 7 is a block diagram of functional layers of the illustrative cloud computing environment of FIG. 6, according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for calculating and optimizing PUE 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for topic recognition using natural language processing, comprising:
    generating, by one or more processors, a knowledge base of information associated with users of a collaborative messaging system, each information entry in the knowledge base being represented as a tuple of pairs including a topic and an additional concept comprising a descriptor of a context associated with the topic;
    receiving, by one or more processors, a written conversation from at least one user of the collaborative messaging system;
    performing, by the one or more processors, a first search in the written conversation to find at least one additional topic associated with the topic stored in the knowledge base of information;
    in response to finding in the written conversation the at least one additional concept associated with the topic stored in the knowledge base of information, tagging, by the one or more processors, the at least one additional concept to the topic and replacing the at least one additional concept with the topic; and
    in response to not finding in the written conversation the at least one additional concept associated with the topic stored in the knowledge base of information, performing, by the one or more processors, a second search in the written conversation to find at least another additional concept not stored in the knowledge base of information and updating the knowledge base of information by associating the at least another additional concept to the topic.

2. The method of claim 1, wherein each time an additional topic is found in a multiplicity of written conversations, respectively, the at least one additional concepts are replaced by the topic.

3. The method of claim 1, wherein the collaborative messaging system comprises a chat session during which the user communicates a text message to at least one another user.

4. The method of claim 1, wherein the knowledge base of information associated with the user comprises information collected from a plurality of sources associated with the user.

5. The method of claim 4, further comprising:
    based on the at least one user being using the collaborative messaging program for a first time, creating an entry in the knowledge base associated with the at least one user.

6. The method of claim 4, further comprising:
    based on information associated with the topic being identified in the collected information and the topic being associated with the at least one user, updating an entry of the topic in the knowledge base associated with the at least one user.

7. The method of claim 4, further comprising:
    based on information associated with the topic being identified in the collected information and the topic not being associated with the at least one user, creating an entry for the topic in the knowledge base to associate the topic with the at least one user.

8. A computer system for topic recognition in a written conversation, comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    generating, by the one or more processors, a knowledge base of information associated with users of a collaborative messaging system, each information entry in the knowledge base being represented as a tuple of pairs including a topic and an additional concept comprising a descriptor of a context associated with the topic;
    receiving, by one or more processors, a written conversation from at least one user of the collaborative messaging system;
    performing, by the one or more processors, a first search in the written conversation to find at least one additional topic associated with the topic stored in the knowledge base of information;
    in response to finding in the written conversation the at least one additional concept associated with the topic stored in the knowledge base of information, tagging, by the one or more processors, the at least one additional concept to the topic and replacing the at least one additional concept with the topic; and
    in response to not finding in the written conversation the at least one additional concept associated with the topic stored in the knowledge base of information, performing, by the one or more processors, a second search in the written conversation to find at least another additional concept not stored in the knowledge base of information and updating the knowledge base of information by associating the at least another additional concept to the topic.

9. The computer system of claim 8, wherein each time an additional topic is found in a multiplicity of written conversations, respectively, the at least one additional concepts are replaced by the topic.

10. The computer system of claim 8, wherein the collaborative messaging system comprises a chat session during which the user communicates a text message to at least one another user.

11. The computer system of claim 8, wherein the knowledge base of information associated with the user comprises information collected from a plurality of sources associated with the user.

12. The computer system of claim 11, further comprising:
based on the at least one user being using the collaborative messaging program for a first time, creating an entry in the knowledge base associated with the at least one user;
based on information associated with the topic being identified in the collected information and the topic being associated with the at least one user, updating an entry of the topic in the knowledge base associated with the at least one user; and
based on information associated with the topic being identified in the collected information and the topic not being associated with the at least one user, creating an entry for the topic in the knowledge base to associate the topic with the at least one user.

13. A computer program product for topic recognition in a written conversation, comprising:
a computer readable storage medium having program instructions embodied therewith, wherein the computer readable storage medium is not a transitory signal per se, the program instructions executable by a device to cause the device to perform a method comprising:
generating, by the one or more processors, a knowledge base of information associated with users of a collaborative messaging system, each information entry in the knowledge base being represented as a tuple of pairs including a topic and an additional concept comprising a descriptor of a context associated with the topic;
receiving, by one or more processors, a written conversation from at least one user of the collaborative messaging system;
performing, by the one or more processors, a first search in the written conversation to find at least one additional topic associated with the topic stored in the knowledge base of information;
in response to finding in the written conversation the at least one additional concept associated with the topic stored in the knowledge base of information, tagging, by the one or more processors, the at least one additional concept to the topic and replacing the at least one additional concept with the topic; and
in response to not finding in the written conversation the at least one additional concept associated with the topic stored in the knowledge base of information, performing, by the one or more processors, a second search in the written conversation to find at least another additional concept not stored in the knowledge base of information and updating the knowledge base of information by associating the at least another additional concept to the topic.

14. The computer program product of claim 13, wherein each time an additional topic is found in a multiplicity of written conversations, respectively, the at least one additional concepts are replaced by the topic.

15. The computer program product of claim 13, wherein the collaborative messaging system comprises a chat session during which the user communicates a text message to at least one another user.

16. The computer program product of claim 13, wherein the knowledge base of information associated with the user comprises information collected from a plurality of sources associated with the user.

17. The computer program product of claim 16, further comprising:
based on the at least one user being using the collaborative messaging program for a first time, creating an entry in the knowledge base associated with the at least one user;
based on information associated with the topic being identified in the collected information and the topic being associated with the at least one user, updating an entry of the topic in the knowledge base associated with the at least one user; and
based on information associated with the topic being identified in the collected information and the topic not being associated with the at least one user, creating an entry for the topic in the knowledge base to associate the topic with the at least one user.

* * * * *